United States Patent
Rozier et al.

(10) Patent No.: US 6,754,595 B1
(45) Date of Patent: Jun. 22, 2004

(54) INDEX RANKING SYSTEMS AND METHODS FOR MONITORING AIR PRESSURE AND FLOW

(75) Inventors: Ron L. Rozier, Lithonia, GA (US); Philip B. Ashcraft, Cumming, GA (US); Steven W. Smith, Columbus, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 210 days.

(21) Appl. No.: 09/968,300

(22) Filed: Oct. 1, 2001

(51) Int. Cl.[7] .............................................. G01F 17/00
(52) U.S. Cl. ............................ 702/50; 702/45; 702/47; 174/37; 174/76; 340/604
(58) Field of Search ........................... 702/50, 45, 47; 324/525, 544; 340/604, 605, 620; 174/76, 20, 22 R, 37; 700/51; 73/40.5 R

(56) References Cited

U.S. PATENT DOCUMENTS

| | | | | |
|---|---|---|---|---|
| 4,480,251 A | * | 10/1984 | McNaughton et al. | 340/604 |
| 4,500,747 A | * | 2/1985 | Dubreuil et al. | 174/76 |
| 4,778,248 A | * | 10/1988 | Arzur et al. | 385/12 |
| 6,031,180 A | * | 2/2000 | Schilling et al. | 174/37 |
| 2002/0077711 A1 | * | 6/2002 | Nixon et al. | 700/51 |

OTHER PUBLICATIONS

"GTE Air Pressure Status Report" Approximately May 2000.

* cited by examiner

*Primary Examiner*—John Barlow
*Assistant Examiner*—Hien Vo
(74) *Attorney, Agent, or Firm*—Merchant & Gould

(57) ABSTRACT

Systems and methods for monitoring the pressurization performance of a cable network, such as a telecommnunications cable network, including monitoring a plurality of pressurization sensors, monitoring a plurality of pressurization alarms, receiving data related to the plurality of pressurization sensors and the plurality of pressurization alarms, and generating an index. The index taking into account the number of pressurization sensors monitored during a predetermined period of time, the number of pressurization sensors which are inoperable during the predetermined period of time, and the number of pressurization alarms which are tripped during the predetermined period of time.

45 Claims, 3 Drawing Sheets

| District Ranking (June, 2001) | | | Status of Devices | | | | | | | | Historical Index (2001) | | | | |
|---|---|---|---|---|---|---|---|---|---|---|---|---|---|---|---|
| | | | # Devices | | # Alarms | | # Inoperable | | Sub. Lines | % Devices in Alarm | May | Apr. | Mar. | Feb. | Jan. |
| Rank | District | Index | Press. | Flow | Press. | Flow | Press. | Flow | | | | | | | |
| 1 | EAST | 107 | 1276 | 302 | 58 | 69 | 34 | 2 | 925 | 7.8% | 177 | 157 | 148 | 112 | 94 |
| 2 | NORTHEAST | 128 | 1096 | 320 | 60 | 59 | 67 | 11 | 657 | 8.4% | 143 | 147 | 155 | 151 | 143 |
| 3 | WEST | 154 | 1902 | 499 | 172 | 138 | 91 | 31 | 1020 | 12.4% | 217 | 215 | 204 | 184 | 176 |
| 4 | SOUTH | 178 | 1382 | 339 | 131 | 79 | 98 | 12 | 722 | 12.3% | 218 | 228 | 212 | 191 | 171 |
| 5 | NORTHWEST | 252 | 2740 | 777 | 397 | 261 | 160 | 52 | 1490 | 18.3% | 262 | 268 | 270 | 247 | 257 |
| 6 | CENTRAL | 277 | 2160 | 444 | 335 | 205 | 180 | 14 | 1087 | 14.9% | 301 | 321 | 284 | 272 | 255 |
| 7 | GA TOTAL | 182 | 10640 | 2690 | 1157 | 811 | 638 | 122 | 5920 | 14.5% | 232 | 240 | 222 | 208 | 198 |

*FIG. 3*

INDEX RANKING SYSTEMS AND METHODS FOR MONITORING AIR PRESSURE AND FLOW

FIELD OF THE INVENTION

The present invention relates generally to systems and methods for monitoring air pressure and flow along pressurized telecommunications cable routes. More specifically, the present invention relates to index ranking systems and methods for monitoring air pressure and flow along pressurized telecommunications cable routes.

BACKGROUND

Each year, telecommunications companies spend large amounts of money pumping air into their cables and pipes which carry and enable the transmission of voice and data information. This low-humidity air creates positive pressure in the cables, enabling them to resist standing water, moisture damage, and the like. Such standing water and moisture damage may lead to noise on the line, data transmission errors, and, ultimately, complete cable failure.

The cables which make up a telecommunications network typically include a sheath made of a water-resistant or waterproof material, such as lead or polyethylene. These sheaths typically encompass wires, such as copper wires, and an insulation material which separates individual conductor pairs. This insulation material may be, for example, paper, pulp, or plastic.

Exposure of the interior of a cable to water or moisture may lead to a number of problems. For example, exposure of the interior of a cable to moisture may destroy the insulating characteristics of the paper or pulp. If cracks develop in the sheath of a cable or the sheath of a cable is sliced, water may enter the cable and electrolysis may occur, resulting in faulted conductor pairs. Thus, the basic premise of cable pressurization is to keep the pressure within a cable in excess of the pressure which could be applied by standing water. To this end, telecommunications companies and related industry associations have established minimum air pressure standards for underground, direct-buried, and aerial cables. For example, a minimum air pressure of six (6) pounds per square inch (PSI) may be required for underground cables, a minimum air pressure of three (3) PSI may be required for direct-buried cables, and a minimum air pressure of one (1) PSI may be required for aerial cables, as they are less at risk from water damage.

The air pumped into pressurized telecommunications cables originates from a plurality of air compressors, typically located in a company's "central offices" or other facilities. These air compressors are preferably coupled with dryers or dehumidifiers operable for removing residual moisture from the air. Because a pressurized cable route may include a plurality of discrete sections of cable, each potentially thousands of feet long, the air pressure tends to decrease as the distance from a central office, and a given air compressor, increases. This pressure drop is due, in part, to the presence of inevitable leaks. Therefore, air pressure is typically re-established along a cable route by running an air pipe along the route and introducing air at a plurality of fixed points. The air pipe is connected to a plurality of manifolds which distribute air to the cables at, for example, each utility hole, making these connections easier to maintain.

In order to maintain a pressurized cable route, a plurality of air pressure and flow monitoring devices or sensors are placed at strategic points along the route (for example, at each manifold). These sensors are typically standard pressure transducers. The air pressure sensors measure the amount of air compression in a given cable volume at a given time in PSI. The flow sensors measure the standard cubic feet of air to pass through a given cable volume in a given period of time in standard cubic feet per hour (SCFH) or standard cubic feet per day (SCFD). Both the air pressure sensors and the flow sensors are linked to monitors in the various central offices so that readings may be taken by maintenance technicians at predetermined times. If the air pressure or flow level for a given sensor drops below a predetermined value, an alarm is tripped. A maintenance technician may then be dispatched to repair the affected cable, air pipe, manifold, etc.

Those who manage the pressurized cable route may collect data from the various central offices and, using existing software programs, analyze maintenance expenditures, track maintenance technician efficiency, identify problems, and rate overall pressurization system quality. This is typically done hierarchically, e.g., by region, district, office, area, and the like. These software programs, such as that used by GTE (the "GTE Air Pressure Status Report"), typically generate summary information related to such items as the number of air pressure and flow alarms for a given period of time, the number of maintenance technician dispatches for a given period of time, a pressurization system quality index (SQI), the total man-hours for a given period of time or per sheath-mile, the operation of given air compressors or dryers, and problem regions, districts, offices, areas, etc. Although marginally useful, this information is typically complex, often inaccurate, and generally expensive to collect. More importantly, this information is dependent upon the schematics of a given pressurized telecommunications cable route, and must take the network layout into account. Thus, what is needed are simple index ranking systems and methods which provide inexpensive and accurate summary information related to the air pressure and flow performance of various regions, districts, offices, and areas.

BRIEF SUMMARY

The present invention provides index ranking systems and methods which take into account such factors as the number of air pressure sensors and flow sensors along a pressurized telecommunications cable route, the number of air pressure and flow alarms which are tripped during a given period of time, and the number of sensors which are inoperable at a given time.

In one embodiment, a method for monitoring the pressurization performance of a telecommunications cable network according to the present invention includes monitoring a plurality of pressurization sensors, monitoring a plurality of pressurization alarms, receiving data related to the plurality of pressurization sensors and the plurality of pressurization alarms, and generating an index. The index takes into account the number of pressurization sensors monitored during a predetermined period of time, the number of pressurization sensors which are inoperable during the predetermined period of time, and the number of pressurization alarms which are tripped during the predetermined period of time.

In another embodiment, a system for monitoring the pressurization performance of a telecommunications cable network according to the present invention includes a plurality of pressurization sensors, a plurality of pressurization alarms, a computer network operable for communicating data related to the plurality of pressurization sensors and the plurality of pressurization alarms, and an index ranking module. The index ranking module is operable for receiving the data communicated by the computer network and generating an index, wherein the index takes into account the number of pressurization sensors monitored during a predetermined period of time, the number of pressurization sensors which are inoperable during the predetermined period of time, and the number of pressurization alarms which are tripped during the predetermined period of time.

In a further embodiment, a computer-readable medium having executable commands operable for monitoring the pressurization performance of a telecommunications cable network includes executable commands operable for monitoring a plurality of pressurization sensors, monitoring a plurality of pressurization alarms, receiving data related to the plurality of pressurization sensors and the plurality of pressurization alarms, and generating an index. The index takes into account the number of pressurization sensors monitored during a predetermined period of time, the number of pressurization sensors which are inoperable during the predetermined period of time, and the number of pressurization alarms which are tripped during the predetermined period of time.

Advantageously, the index ranking systems and methods of the present invention provide cheap and accurate summary information related to the air pressure and flow performance of various regions, districts, offices, and areas. More importantly, the information provided by the systems and methods of the present invention is independent of the schematics of a given pressurized telecommunications cable route.

BRIEF DESCRIPTION OF THE FIGURES

FIG. 3 is an example of a report generated using the systems and methods of the present invention.

DETAILED DESCRIPTION

Figure 1:
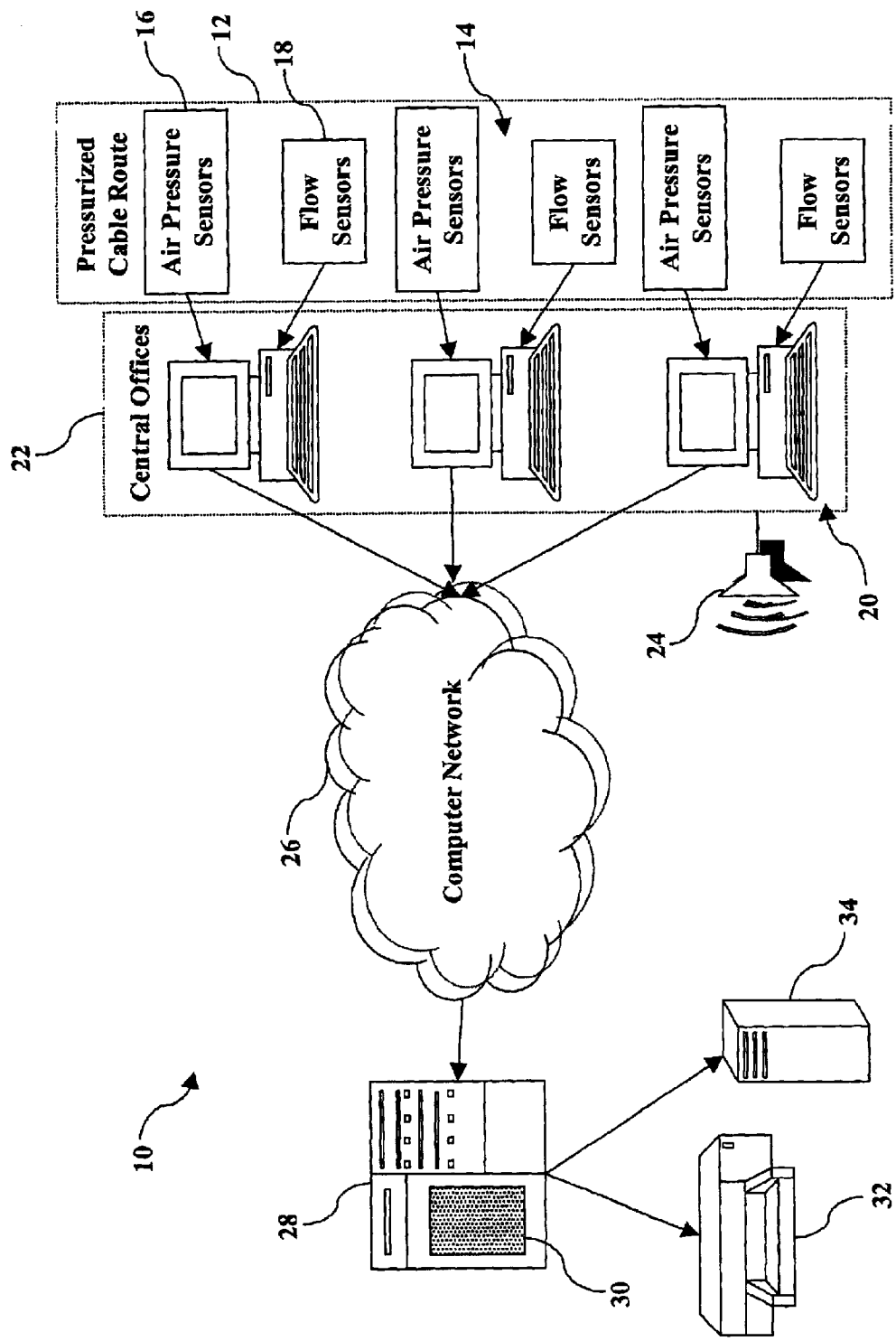
FIG. 1 is a schematic diagram of one embodiment of a system for monitoring the air pressure and flow along a pressurized telecommunications cable route.

Referring to FIG. 1, in one embodiment, a system 10 for monitoring the air pressure and flow along a pressurized telecommunications cable route 12 includes a plurality of monitoring devices or sensors 14. These sensors 14 may be, for example, standard pressure transducers which utilize variations in electrical resistance to detect air pressure conditions, flow conditions, and the like. The sensors 14 are preferably placed at strategic points along the cable route 12. They may be placed, for example, at each manifold. The sensors 14 may be used to monitor air pressure and/or flow through a given air pipe or series of air pipes and through a given cable or series of cables. The air pressure sensors 16 measure the amount of air compression in a given cable volume at a given time in pounds per square inch (PSI). The flow sensors 18 measure the standard cubic feet of air to pass through a given cable volume in a given period of time in standard cubic feet per hour (SCFH) or standard cubic feet per day (SCFD). Both the air pressure sensors 16 and the flow sensors 18 are preferably linked to monitors 20 in the various central offices 22 so that readings may be taken by maintenance technicians at predetermined times. These monitors 20 may be, for example, computers, electronic panels, mechanical panels, etc. If the air pressure or flow level for a given sensor 14 drops below a predetermined value, an alarm 24 is tripped in the respective central office 22. A maintenance technician may then be dispatched to repair the affected cable, air pipe, manifold, and the like.

As described above, management collects data from the various central offices 22 and uses the data to analyze maintenance expenditures, track maintenance technician efficiency, identify problems, and rate overall pressurization system quality. This is typically done hierarchically, e.g., by region, district, office, area, and the like. The software programs used typically generate summary information related to such items as the number of air pressure and flow alarms for a given period of time, the number of maintenance technician dispatches for a given period of time, a pressurization system quality index (SQI), the total man-hours for a given period of time or per sheath-mile, the operation of given air compressors or dryers, and problem regions, districts, offices, areas, etc.

Typically, pressurization-related data is communicated from the various central offices 22 to management via shared computer files, the telephone, facsimile, etc. Referring again to FIG. 1, the system 10 of the present invention includes a computer network 26 operable for communicating pressurization-related data from the various central offices 22 to a server 28. The computer network 26 may be, for example, a local-area network (LAN), a wide-area network (WAN), or a globally-distributed computer network, such as the Internet. The server 28 may be, for example, a file server, a web server, or a database server. The server 28 preferably includes a processor and a memory. The processor may be a microprocessor, such as that manufactured by Advanced Micro Devices, Inc. (Sunnyvale, Calif.), Intel Corporation (Santa Clara, Calif.), Motorola, Inc. (Schaumburg, Ill.), International Business Machines Corp. (Armonk, N.Y.), and Transmeta Corp. (Santa Clara, Calif.). The server 28 may be, for example, a Compaq ProLiant ML530 server (Compaq Corp, Houston, Tex.). The memory may include a random-access memory (RAM) and a read-only memory (ROM), as well as other types of memory.

An index ranking module 30 is disposed within the server 28. The index ranking module 30, comprises an application, or algorithm, operable for generating a pressurization performance index for a given region, district, office, or area taking into account such factors as the number of air pressure sensors 16 and flow sensors 18 along a pressurized cable route 12, the number of air pressure and flow alarms which are tripped during a given period of time, and the number of sensors 14 which are inoperable at a given time. The index ranking module 30 is also operable for ranking the pressurization performance indices and generating summary information such that management may assess the relative performance of a given region, district, office, or area. The index ranking module 30 may include an internal database application operable for storing and archiving pressurization-related data and summary information, and may display this data and information via a spreadsheet application and a graphical user interface (GUI). The index ranking module 30 is preferably in communication with a printer 32 operable for printing the pressurization-related data collected from the various central offices 22 and the summary information generated by the index ranking module 30. The index ranking module 30 may also be in communication with an external database application 34 operable for storing and archiving the data and summary information.

Figure 2:
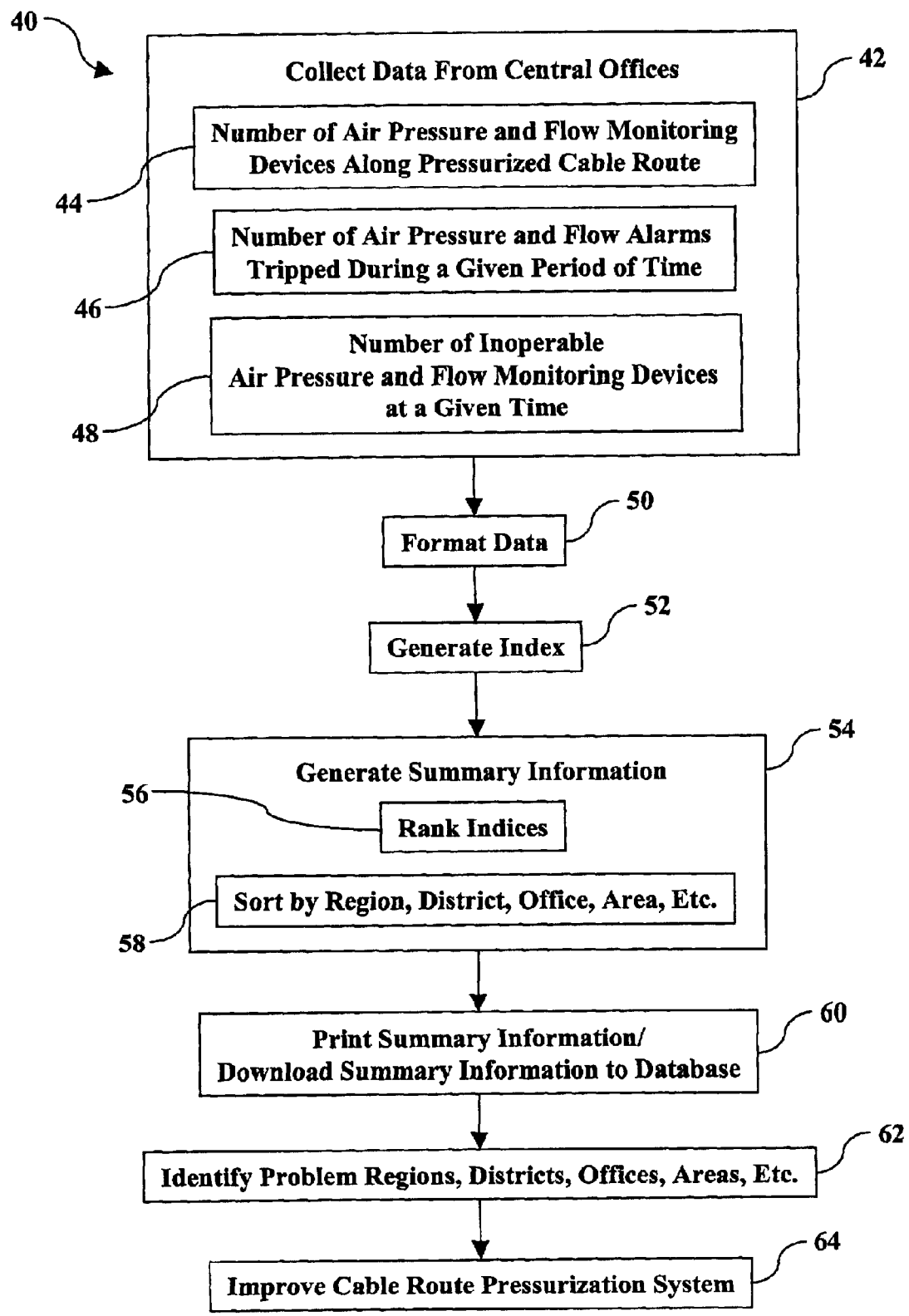
FIG. 2 is a flow chart of one embodiment of a method for monitoring the air pressure and flow along a pressurized telecommunications cable route.

Referring to FIG. 2, in one embodiment, a method 40 for monitoring the air pressure and flow along a pressurized telecommunications cable route 12 (FIG. 1) includes a plurality of steps beginning with collecting pressurization-related data from various central offices 22 (FIG. 1) via a computer network 26 (FIG. 1), such as a LAN, a WAN, or the Internet (Block 42). This data preferably includes the number of air pressure sensors 16 (FIG. 1) and flow sensors 18 (FIG. 1) along the cable route 12 (Block 44), the number of air pressure and flow alarms tripped during a given period of time (Block 46), and the number of sensors 14 (FIG. 1) which are inoperable at a given time (Block 48). This data also preferably includes the location of each air pressure sensor 16 and flow sensor 18 along the cable route 12, and the time. The data is formatted or sorted and stored or archived by the index ranking module 30 (FIG. 1) (Block 50) and an index is generated for each region, district, office, or area (Block 52). The index may be expressed by any one of a plurality of equations. In the embodiment shown, the index is expressed by the following equation:

$$\text{Index} = [(\# \text{ of alarms}) + (\# \text{ of inoperable sensors})]/(\text{total } \# \text{ of sensors}), \quad (1)$$

where (# of alarms) is the number of air pressure and flow alarms tripped during a given period of time, (# of inoperable sensors) is the number of sensors 14 which are inoperable at a given time, and (total # of sensors) is the total number of air pressure sensors 16 and flow sensors 18 along the cable route 12. Equation (1) typically produces an index value between 0 and 500 when multiplied by a constant, such as 1000. Exemplary index values include 107, 128, 154, 178, 252, 277, and the like (see FIG. 3).

Once a plurality of indices are generated for a plurality of regions, districts, offices, or areas, the index ranking module 30 generates summary information related to the indices (Block 54). The index ranking module 30 preferably ranks the indices (Block 56) and sorts the indices hierarchically, by region, district, office, area, and the like (Block 58). The index ranking module 30 may also rank and sort the indices by other than geographic area. This summary information may then be displayed, manipulated, printed, and/or downloaded to an external database application 34 (FIG. 1) (Block 60). Management preferably uses this summary information to identify problem regions, districts, offices, or areas (Block 62) and to improve an overall cable route pressurization system (Block 64).

An exemplary report 70 generated using the systems and methods of the present invention is provided in FIG. 3. The report 70 presents the air pressurization system performance index 72 of six (6) districts 74 in the State of Georgia. These districts 74 are ranked 76 according to their index values 72. The report 70 also presents the total number of air pressure sensors 16 (FIG. 1) and flow sensors 18 (FIG. 1) present along the pressurized cable route 12 (FIG. 1) in each district 74, 78, the number of air pressure and flow alarms tripped during the predetermined period of time (June, 2001) in each district 74, 80, and the number of inoperable air pressure sensors 16 and flow sensors 18 along the pressurized cable route 12 in each district 74, 82. The report 70 further presents the percentage of air pressure sensors 16 and flow sensors 18 in alarm during the predetermined period of time 84 and historical indices 86 for each of the districts 74. Management may use the information presented to identify a problem district (with a problem district having a relatively higher index value), to determine where immediate repairs or corrective actions are needed, to determine where additional expenditures should be made, to determine where equipment should be upgraded, to determine where personnel changes should be made, and the like. Management may also use the information presented to track the effectiveness of such changes over time. In general, the report 70 provides management with a tool to determine which portions of their pressurized cable network are operating efficiently and which portions of their pressurized cable network are not. The report 70 also provides management with a tool to create competition between geographic areas and motivate.

It is apparent that there has been provided, in accordance with the present invention, index ranking systems and methods for monitoring air pressure and flow along a pressurized telecommunications cable route. While the present invention has been shown and described in conjunction with examples and preferred embodiments thereof, variations in and modifications to the present invention may be effected by persons of ordinary skill in the art without departing from the spirit or scope of the invention. For example, in addition to ranking pressurization performance hierarchically with respect to regions, districts, offices, and areas, the systems and methods of the present invention may be used to rank pressurization performance hierarchically with respect to compressor/dryer types, specific compressors/dryers, areas managed by given managers, areas serviced by given maintenance technicians, etc. It is therefore to be understood that the principles described herein apply in a similar manner, where applicable, to all examples and preferred embodiments and the following claims are intended to cover all equivalent embodiments.

What is claimed is:

1. A method for monitoring the pressurization performance of a cable network, the method comprising:

monitoring a plurality of pressurization sensors;

monitoring a plurality of pressurization alarms;

receiving data related to the plurality of pressurization sensors and the plurality of pressurization alarms; and generating an index, wherein the index takes into account the number of pressurization sensors monitored during a predetermined period of time, the number of pressurization sensors which were inoperable during the predetermined period of time, and the number of pressurization alarms which are tripped during the predetermined period of time.

2. The method of claim 1, wherein the index is expressed by the following equation:

$$\text{Index} = [(\# \text{ of alarms}) + (\# \text{ of inoperable sensors})]/(\text{total } \# \text{ of sensors}).$$

3. The method of claim 1, wherein the plurality of pressurization sensors are operable for measuring air pressure.

4. The method of claim 1, wherein the plurality of pressurization sensors are operable for measuring air pressure.

5. The method of claim 1, further comprising generating a plurality of indices, wherein each index corresponds to a predetermined group.

6. The method of claim 5, wherein the predetermined group comprises a group selected from the group consisting of a region, a district, an office, or an area.

7. The method of claim 5, further comprising ranking the plurality of indices.

8. The method of claim 5, further comprising generating a report related to the plurality of indices.

9. The method of claim 8, wherein the report comprises the relative ranking of each of the plurality of indices corresponding to the plurality of predetermined groups during the predetermined period of time.

10. The method of claim 8, herein the report comprises a plurality of historical indices corresponding to the plurality of predetermined groups.

11. The method of claim 5, further comprising storing the plurality of indices in a persistent storage device.

12. The method of claim 1, wherein the cable network comprises a telecommunications cable network.

13. A system for monitoring the pressurization performance of a cable network, the system comprising:
- a plurality of pressurization sensors;
- a plurality of pressurization sensors;
- a computer network operable for communicating data to the plurality of pressurization sensors and the plurality of pressurization alarms; and
- an index ranking module operable for receiving the data communicated by the computer network and generating an index, wherein the index takes into account the number of pressurization sensors monitored during a predetermined period of time, the number of pressurization sensors which are inoperable during the predetermined period of time, and the number of pressurization alarms which are tripped during the predetermined period.

14. The system of claim 13, wherein the index is expressed by the following equation:

$$\text{Index} = [(\# \text{ of alarms}) + (\# \text{ of inoperable sensors})] / (\text{total } \$ \text{ of sensors}).$$

15. The system of claim 13, wherein the plurality of pressurization sensors are operable for measuring air pressure.

16. The system of claim 13, wherein the plurality of pressurization sensors are operable for measuring air flow.

17. The system of claim 13, wherein the index ranking module is further operable for generating a plurality of indices, wherein each index corresponds to a predetermined region, district, office, or area.

18. The system of claim 17, wherein the index ranking module is further operable for ranking the plurality of indices.

19. The system of claim 17, further comprising a printer operable for generating a report related to the plurality of indices.

20. The system of claim 19, wherein the report comprises the relative ranking of each of the plurality of indices corresponding to the plurality of predetermined regions, districts, offices, or areas during the predetermined period of time.

21. The system of claim 19, wherein the report comprises a plurality of historical indices corresponding to the plurality of predetermined regions, districts, offices, or areas.

22. The system of claim 17, further comprising a persistent storage device operable for storing the plurality of indices.

23. The system of claim 13, wherein the cable network comprises a telecommunications cable network.

24. A computer-readable medium having executable commands operable for monitoring the pressurization performance of a cable network, the executable commands comprising:
- monitoring a plurality of pressurization sensors;
- monitoring a plurality of pressurization alarms;
- receiving data related to the plurality of pressurization sensors and the plurality of pressurization alarms; and
- generating an index, wherein the index takes into account the number of pressurization sensors monitored during a predetermined period of time, the number of pressurization sensors which are inoperable during the predetermined period of time, and the number of pressurization alarms which are tripped during the predetermine period of time.

25. The computer-readable medium having executable commands of claim 24, wherein the index is expressed by the following equation:

$$\text{Index} = [(\# \text{ of alarms}) + (\# \text{ of inoperable sensors})] / (\text{total } \$ \text{ of sensors}).$$

26. The computer-readable medium having executable commands of claim 24, wherein the plurality of pressurization sensors are operable for measuring air pressure.

27. The computer-readable medium having executable commands of claim 24, wherein the plurality of pressurization sensors are operable for measuring air flow.

28. The computer-readable medium having executable commands of claim 24, further comprising generating a plurality of indices, wherein each index corresponds to a predetermined region, district, office, or area.

29. The computer-readable medium having executable commands of claim 28, further comprising ranking the plurality of indices.

30. The computer-readable medium having executable commands of claim 28, further comprising generating a report related to the plurality of indices.

31. The computer-readable medium having executable commands for claim 28, further comprising storing the plurality of indices in a persistent storage device.

32. The computer-readable medium having executable commands of claim 24, wherein the cable network comprises a telecommunications cable network.

33. A method for monitoring the pressurization performance of a telecommunications cable network, the method comprising:
- monitoring a plurality of pressurization sensors;
- monitoring a plurality of pressurization alarms;
- receiving data related to the plurality of pressurization sensors and the plurality of pressurization alarms; and
- generating an index, wherein the index takes into account the number of pressurization sensors monitored during a predetermined period of time, the number of pressurization sensors which are inoperable during the predetermined period of time, and the number of pressurization alarms which are tripped during the predetermine period of time.

34. The method of claim 33, wherein the index is expressed by the following equation:

$$\text{Index} = [(\# \text{ of alarms}) + (\# \text{ of inoperable sensors})] / (\text{total } \# \text{ of sensors}).$$

35. The method of claim 33, wherein the plurality of pressurization sensors are operable for measuring air pressure.

36. The method of claim 33, wherein the plurality of pressurization sensors are operable for measuring air pressure.

37. The method of claim 33, further comprising generating a plurality of indices, wherein each index corresponds to a predetermined group.

38. The method of claim 37, wherein the predetermined group comprises a group selected from the group consisting of a region, a district, an office, or an area.

39. The method of claim 37, further comprising ranking the plurality of indices.

40. The method of claim 37, further comprising generating a report related to the plurality of indices.

41. The method of claim 40, wherein the report comprises the relative ranking of each of the plurality of indices corresponding to the plurality of predetermined groups during the predetermined period of time.

42. The method of claim 40, herein the report comprises a plurality of historical indices corresponding to the plurality of predetermined groups.

43. The method of claim 37, further comprising storing the plurality of indices in a persistent storage device.

44. A system for monitoring the pressurization performance of a telecommunications cable network, the system comprising:

a plurality of pressurization sensors;

a plurality of pressurization sensors;

a computer network operable for communicating data to the plurality of pressurization sensors and the plurality of pressurization alarms; and an index ranking module operable for receiving the data communicated by the computer network and generating an index, wherein the index takes into account the number of pressurization sensors monitored during a predetermined period of time, the number of pressurization sensors which are inoperable during the predetermined period of time, and the number of pressurization alarms which are tripped during the predetermined period.

45. A computer-readable medium having executable commands operable for monitoring the pressurization performance of a telecommunications cable network, the executable commands comprising:

monitoring a plurality of pressurization sensors;

monitoring a plurality of pressurization alarms;

receiving data related to the plurality of pressurization sensors and the plurality of pressurization alarms; and generating an index, wherein the index takes into account the number of pressurization sensors monitored during a predetermined period of time, the number of pressurization sensors which are inoperable during the predetermined period of time, and the number of pressurization alarms which are tripped during the predetermine period of time.

* * * * *

UNITED STATES PATENT AND TRADEMARK OFFICE
CERTIFICATE OF CORRECTION

PATENT NO.   : 6,754,595 B1
DATED         : June 22, 2004
INVENTOR(S)  : Rozier et al.

It is certified that error appears in the above-identified patent and that said Letters Patent is hereby corrected as shown below:

Column 7,
Line 11, "sensors" should read -- alarms --
Line 27, "(total $ of sensors)" should read -- (total # of sensors) --

Column 8,
Line 10, "(total $ of sensors)" should read -- (total # of sensors) --

Column 9,
Line 16, "sensors" should read -- alarms --

Signed and Sealed this

Eighth Day of February, 2005

JON W. DUDAS
*Director of the United States Patent and Trademark Office*